Feb. 25, 1964  V. J. SAPORITO  3,122,617
PRESSURE CONTROL SWITCH
Filed Oct. 7, 1960

INVENTOR.
VINCENT J. SAPORITA
BY
OSTROLENK, FABER, GERB & SOFFEN
ATTORNEYS

United States Patent Office 3,122,617
Patented Feb. 25, 1964

3,122,617
PRESSURE CONTROL SWITCH
Vincent J. Saporito, Bayside, N.Y., assignor to Kollsman Instrument Corporation, Elmhurst, N.Y., a corporation of New York
Filed Oct. 7, 1960, Ser. No. 61,272
3 Claims. (Cl. 200—83)

This invention relates to a pressure control switch and more particularly relates to a novel switch which is actuated in accordance with a predetermined adjustable pressure ratio.

There are many applications wherein an electrical switch is to be closed in accordance with some predetermined pressure condition. By way of example, in aircraft systems it is necessary and desirable to have a switching device which closes or opens an electrical circuit as the Mach number of the aircraft reaches some particular value. Thus, an aircraft with some maximum Mach number rating may be provided with automatic emergency indicating means which is energized responsive to the measurement of this predetermined Mach number.

In measuring Mach number, the Mach number will be seen to be comprised of the dynamic pressure measured by a Pitot minus the static pressure, this difference being divided by the static pressure. Thus, the Mach number is a function of the ratio of the differential pressure and the static pressure.

The switch of the present invention is further operable so that regardless of the particular value of either of the elements forming the ratio, so long as the ratio is at some predetermined value the switch will remain closed. Switches of this type are well-known to the art, but rather than being operable responsive to the ratio of different pressures, they have directly measured the particular pressures forming the relationship to be controlled. Therefore, relatively complex linkages have been required to modify the various pressure measuring diaphragm motions where the switch is to be actuated in response to the ratio of two different pressure quantities.

The essence of the instant invention is to provide a novel switch which is directly operable responsive to some pressure ratio and is formed of two diaphragms which are positioned to define three pressure containing areas. The diaphragms directly carry cooperating contacts where the relative position of these cooperating contacts will be shown to be directly related to the differential pressure across each of the diaphragms. Accordingly, the contact closed position can be established for some predetermined ratio of pressures to render the switch directly responsive to pressure ratio in the absence of any connecting linkage to modify the motion of the diaphragms.

In applying the switch to a Mach number switch, the central chamber defined by the two diaphragms is connected to a source of static pressure. The chamber external of the first diaphragm is then connected to a source of Pitot pressure so that the differential pressure exerted upon the first diaphragm is equal to the Pitot pressure minus static pressure. The chamber external of the second diaphragm is completely evacuated so that the motion of this second diaphragm is completely responsive to static pressure. The contacts carried by the two diaphragms will then be positioned in accordance with the ratio of the differential pressure of the two diaphragms whereby by initially spacing them at some predetermined distance, the switch will close at a predetermined Mach number and will remain closed so long as the pressure ratio defining the Mach number is retained.

Accordingly, a primary object of this invention is to provide a novel pressure ratio switch.

Another object of this invention is to provide a novel pressure responsive switch which utilizes two diaphragm members which carry a pair of cooperating contacts.

A further object of this invention is to provide a novel pressure ratio switch which incorporates two diaphragms wherein the distance between the diaphragms is adjustable in order to adjust the pressure ratio at which contacts actuated by the diaphragms are closed.

Another object of this invention is to provide a novel pressure ratio switch wherein a pair of diaphragms define three pressure chambers which are connectable to impose different pressure ratios across the diaphragms wherein the ratio of these differential pressures directly defines the motion of contacts carried by the diaphragms.

Another object of this invention is to provide a novel adjustable pressure ratio switch which can be easily preset in the field and is highly resistant to shock and acceleration forces.

A further object of this invention is to provide a novel adjustable pressure ratio switch which is highly economic in manufacture.

These as well as other objects of the instant invention shall become readily apparent after reading the following description of the accompanying drawings in which.

Figure 2:
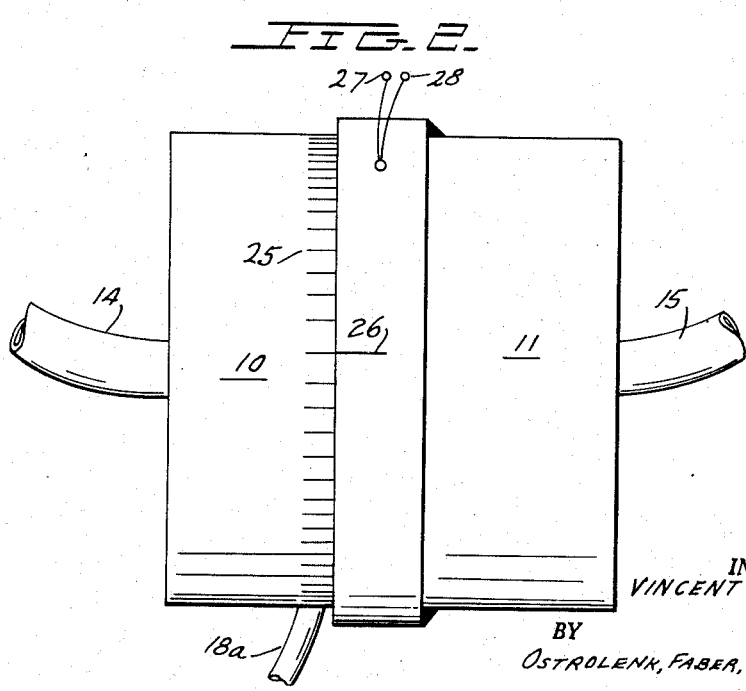
FIGURE 2 is a side plan view of the switch of FIGURE 1.

Referring now to the figures, my novel switch is comprised of two identical cup-shaped members 10 and 11 which have centrally located threaded openings 12 and 13, respectively, which are operable to receive pressure conduits such as pressure conduits 14 and 15, respectively, of FIGURE 2. Housing portion 10 receives a circular corrugated diaphragm 16, while member 11 receives an identical corrugated diaphragm 17.

A first pressure chamber is thus formed between the bottom of member 10 and the left-hand surface of diaphragm 16, while a second pressure chamber is defined between the bottom of member 11 and the right-hand surface of diaphragm 17. A conduit receiving aperture 18 which can receive conduit 18a as shown in FIGURE 2 is then formed in one of the housings 10 or 11, shown as being formed in housing 10 in FIGURE 1, to connect a predetermined pressure into the third chamber which is defined between the right-hand surface of diaphragm 16 and the left-hand surface of diaphragm 17. The two members 10 and 11 are joined together to complete this third chamber as by welding a ring 19 around the periphery of member 11. The internal surface of ring 19 is threaded, and cooperating threads are formed in the external portion of the periphery of member 10, whereby member 11 may be threaded onto member 10, the threaded connection being such that an air-tight seal is formed. If desired, and in order to enhance this seal, a flexible ring 20 may be secured to the interior of member 11 to serve as a flap type valve with respect to the interior surface of member 11 as shown.

Figure 1:
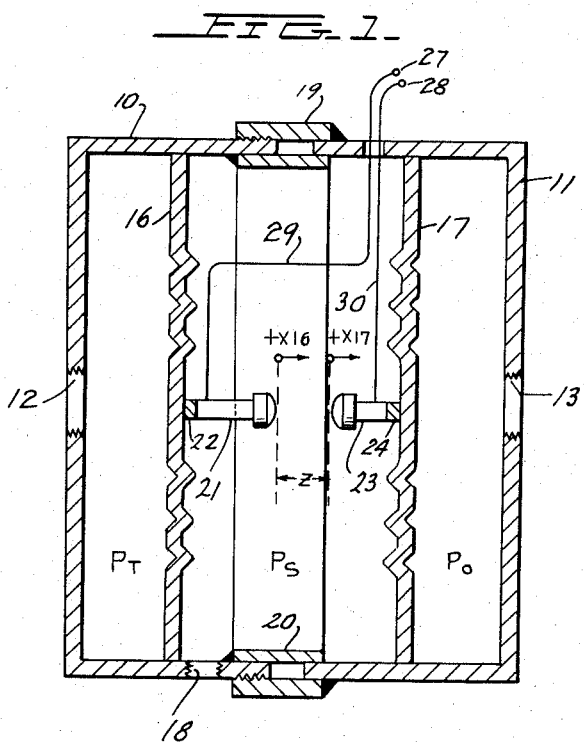
FIGURE 1 shows a side cross-sectional view through the center of a preferred embodiment of the invention.

The center of diaphragm 16 is rigidly secured to contact member 21 through a mechanical insulating connection such as epoxy type glue member 22, and in a similar manner, a contact structure 23 is connected to diaphragm 17 by an epoxy type member 24. The surfaces of contacts 21 and 23 are spaced from one another by a distance Z, this distance Z being made larger or smaller by threading ring 19 toward or away from member 10. In order that this distance may be accurately controlled, the surfaces of housing 10 may have micrometer type indications 25 as shown in FIGURE 2, while ring 19 may have the movable indicator 26 marked thereon. The operation of the novel switch structure of FIGURES 1 and 2 is as follows:

The diaphragms 16 and 17 are assumed to have motions which are linear with the logarithm of the pressure differential across each respective diaphragm. The scale factor or deflection per unit log of pressure will be essentially the same for each of the diaphragms. To analyze the motion of these diaphragms and thus the contacts, assume that the differential pressure across diaphragm 16 is equal to:

$$P_T - P_S = P_A$$

where $P_T$ is the pressure in the left-hand chamber and $P_S$ is the pressure in the central chamber of FIGURE 1.

The differential pressure across diaphragm 17 will be $$P_S - P_O = P_B$$

where $P_O$ is the pressure in the right-hand chamber of FIGURE 1.

If $F_1$ is the scale factor in inches of deflection per unit log of pressure, $X_{16}$ is the motion of diaphragm 16. The distance Z will be a preset distance when $$P_T = P_S = P_O$$

or the pressures in all of the chambers are equal.

The motion of diaphragm 16 follows the following relation:

$$X_{16} = F_1 \log P_A$$

The motion of diaphragm 17 will be $$X_{17} = F_1 \log P_B$$

In order to obtain closure of contacts 21 and 23, $X_{16}$ must equal $Z + X_{17}$ or $$F_1 \log P_A = Z + F_1 \log P_B$$

or $$Z = F_1 \log \frac{P_A}{P_B}$$

From this last relation, it will be clear that contact closure will occur when the ratio of $P_A$ and $P_B$ is equal to or greater than the value which satisfies the equation. Accordingly, switch closure can be obtained at any predetermined pressure ratio $P_A$ or $P_B$ by a simple adjustment of distance Z.

In applying this novel switch structure to a Mach number switch indicator, it will be assumed that terminals 27 and 28 which are connected to leads 29 and 30, respectively, of contacts 21 and 23 respectively, and are taken through member 11 in an air-tight manner are connected to some type of indicating device or automatic control device.

Since it has been previously indicated that Mach number is proportional to the ratio of indicated dynamic pressure obtained from a typical wing-type Pitot static head minus the static pressure to the static pressure, each of the elements of the ratio may be applied to each of diaphragms 16 and 17, respectively. Thus, the pressure $P_T$ in the left-hand diaphragm may be connected to the indicated dynamic pressure over conduit 14. The static pressure may then be connected to the central chamber through conduit 18a to establish pressure $P_S$ in the central chamber, while the right-hand chamber may be evacuated with conduit 15 being replaced by a sealing means to retain this chamber evacuated.

Accordingly, the pressure differential on diaphragm 16 will be the dynamic pressure minus the static pressure, while the differential pressure on diaphragm 17 will be equal to the static pressure. Hence, the contacts will move through the predetermined distance Z depending upon the ratio preselected for causing contact closure which in turn is related to some predetermined Mach number.

Clearly, where the Mach number actuation is to be changed, one need only rotate members 10 and 11 with respect to one another to change the preset distance Z, whereby the contacts will close at some different ratio of pressure and thus at some different Mach number.

Although I have here described preferred embodiments of my novel invention, many variations and modifications will now be apparent to those skilled in the art, and I, therefore, prefer to be limited not by the specific disclosure herein but only by the appended claims.

I claim:

1. A pressure ratio indicating device; said pressure ratio indicating device comprising a housing having a first and second diaphragm positioned therein and extending completely across said housing; said first diaphragm and a wall of said container defining a first pressure chamber; said first diaphragm and said second diaphragm defining a second pressure chamber; said second diaphragm and a second wall of said container defining a third pressure chamber; each of said first, second and third pressure chambers receiving conduit means; said first and second diaphragms being operatively connected to contact means and moving said contact means between an engaged and disengaged position responsive to pressure conditions in said first second and third pressure chambers; said contacts being moved to an engaged position responsive to a predetermined ratio of differential pressures across said first and second diaphragms, respectively.

2. A pressure ratio indicating device; said pressure ratio indicating device comprising a housing having a first and second diaphragm positioned therein and extending completely across said housing; said first diaphragm and a wall of said container defining a first pressure chamber; said first diaphragm and said second diaphragm defining a second pressure chamber; said second diaphragm and a second wall of said container defining a third pressure chamber; each of said first, second and third pressure chambers receiving conduit means; said first and second diaphragms being operatively connected to contact means and moving said contact means between an engaged and disengaged position responsive to pressure conditions in said first, second and third pressure chambers; said contacts being moved to an engaged position responsive to a predetermined ratio of differential pressures across said first and second diaphragms, respectively; the position of said diaphragms being adjustable with respect to one another to control said ratio.

3. A pressure ratio indicating device; said pressure ratio indicating device comprising a housing having a first and second diaphragm positioned therein and extending completely across said housing; said first diaphragm and a wall of said container defining a first pressure chamber; said first diaphragm and said second diaphragm defining a second pressure chamber; said second diaphragm and a second wall of said container defining a third pressure chamber; each of said first, second and third pressure chambers receiving conduit means; said first and second diaphragms being operatively connected to contact means and moving said contact means between an engaged and disengaged position responsive to pressure conditions in said first, second and third pressure chamber; said contacts being moved to an engaged position responsive to a predetermined ratio of differential pressures across said first and second diaphragms, respectively; the position of said diaphragms being adjustable with respect to one another to control said ratio; said diaphragms being in parallel planes and being axially spaced with respect to one another.

References Cited in the file of this patent

UNITED STATES PATENTS

| | | |
|---|---|---|
| Re. 25,093 | Johanson et al. | Dec. 5, 1961 |
| 2,656,428 | Harris | Oct. 20, 1953 |
| 3,009,031 | Friend et al. | Nov. 14, 1961 |